Feb. 21, 1967

JAMES E. WEBB 3,305,810
ADMINISTRATOR OF THE NATIONAL AERONAUTICS
AND SPACE ADMINISTRATION
SOLENOID CONSTRUCTION

Filed Nov. 24, 1964

RUDOLPH RUST
RONALD M. NOBLE
INVENTORS

BY *9 H m C Coy*

ATTORNEY

Feb. 21, 1967                      JAMES E. WEBB                    3,305,810
             ADMINISTRATOR OF THE NATIONAL AERONAUTICS
                      AND SPACE ADMINISTRATION
Filed Nov. 24, 1964        SOLENOID CONSTRUCTION
                                                              2 Sheets-Sheet 2

RUDOLPH RUST
RONALD M. NOBLE
        INVENTORS,

BY    *[signature]*

ATTORNEY

United States Patent Office 3,305,810
Patented Feb. 21, 1967

3,305,810
SOLENOID CONSTRUCTION
James E. Webb, Administrator of the National Aeronautics and Space Administration, with respect to an invention of Rudolph Rust and Ronald M. Noble
Filed Nov. 24, 1964, Ser. No. 413,662
5 Claims. (Cl. 335—300)

The invention described herein was made in the performance of work under a NASA contract and is subject to the provisions of Section 305 of the National Aeronautics and Space Act of 1958, Public Law 85-568 (72 Stat. 435; 42 U.S.C. 2457).

The present invention relates to an improved solenoid or electromagnet and is particularly useful, but not limited to the construction of electromagnets capable of producing extremely high magnetic field intensities of, for example, 100 kilogauss.

It is oftentimes desirable to provide a cooling means for the winding of an electromagnet. Such cooling means usually involves the passage of a cooling medium such as, for example, water through conduit means which is in heat-conductive relationship to the electromagnet winding. Because of other considerations, discussed herein, such cooling medium was required to have a very low electrical conductivity and for that reason, when water was used as the cooling medium, it was required that the water be distilled water of the required low conductivity. This requirement of low conductivity precluded one from using a corrosion inhibitor in the water with the result that one could not realize the beneficial results of a corrosion inhibitor in the cooling water.

It is therefore a general object of the present invention to provide an improved solenoid or electromagnet structure which is particularly useful in the production of magnetic field intensities in the 100 kilogauss range.

A specific object of the present invention is to provide such a structure which is efficiently cooled by water having a corrosion inhibitor added thereto.

Another specific object of the present invention is to provide a structure of this character which does not require pure distilled water as a cooling medium for reasonably long life or for high efficiency.

Another specific object of the present invention is to provide a structure of this character in which the cooling medium may have, for example, a resistivity of the order of, for example, 300–600 ohm centimeters produced, for example, by adding 500 to 1000 parts per million of sodium nitrite to the cooling water for corrosion prevention.

Another specific object of the present invention is to provide a structure of this character wherein the cooling medium flows through passageways which are located within each turn of the electromagnet coil in contrast to prior art arrangements wherein the cooling medium flows around each turn of a coil.

Another specific object of the present invention is to provide a structure of this character wherein the cooling medium flows through zero voltage gradient portions of an electromagnet whereby the electrical conductivity of the cooling medium is prevented from playing a role in establishing power losses determinitive of the electrical efficiency of the structure.

Another specific object of the present invention is to provide a structure of this character in which a structural plastic material may be used between coil turns in such a manner that the coil can withstand internal stress and strain forces along its longitudinal axis far beyond the maximum allowable in prior art structures, thereby providing a much needed safety factor that precludes the possibility of adjacent coil turns shorting together.

Another specific object of the present invention is to provide an improved electromagnet having a sandwiched winding capable of withstanding large mechanical forces created by an intense magnetic field and by expansion and contraction as a result of heat, with such winding being so constructed that it provides a conduit means for water containing a corrosion inhibitor and without the resulting relatively high conductivity of the coolant playing a role in developing useless heat, thereby achieving the net result of long, safe service life accompanied by high electrical efficiency.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings, in which:

Figure 1:
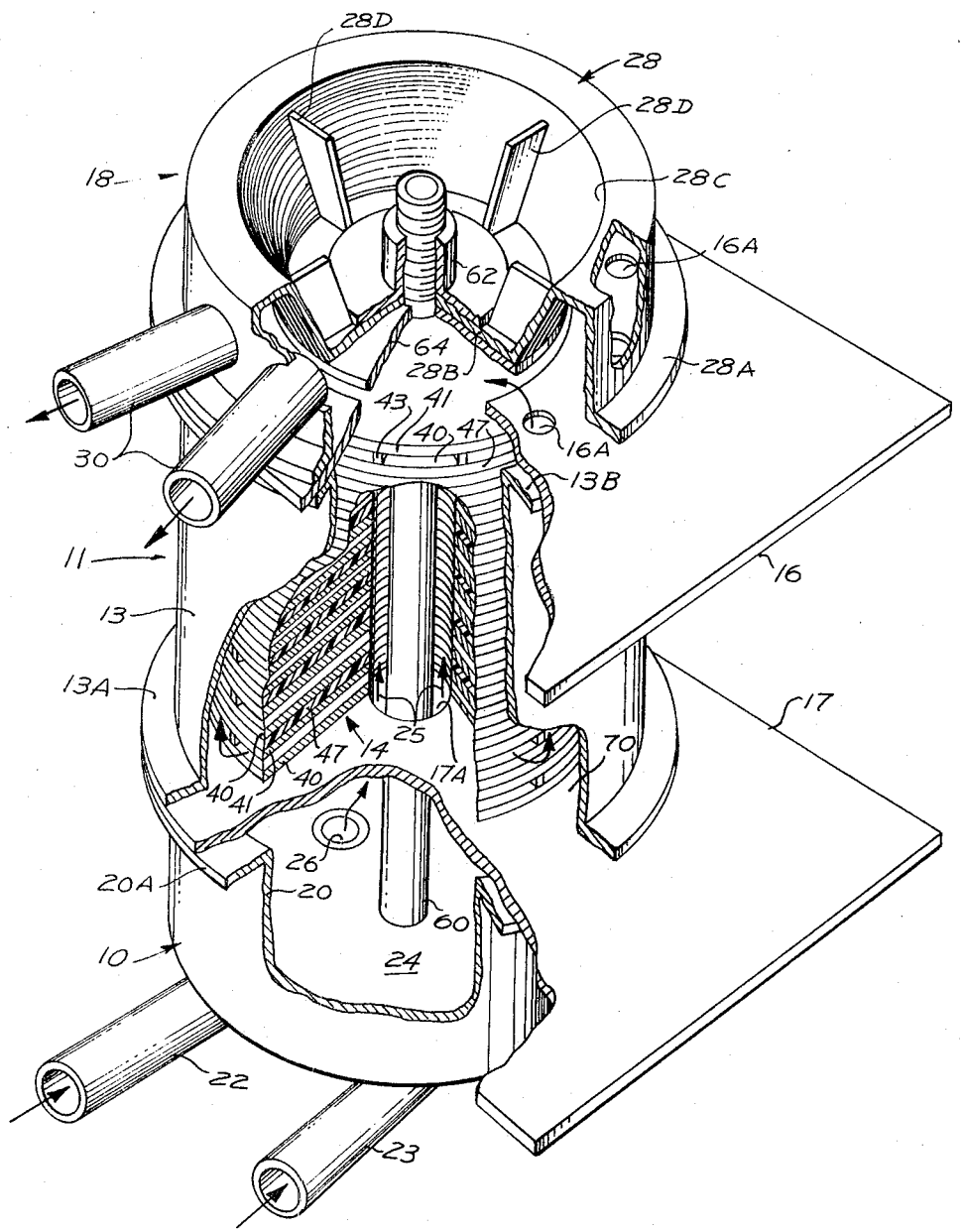
FIG. 1 is a perspective view of a structure embodying features of the present invention, with a portion of the same broken away for purposes of showing internal construction.

The electromagnet shown in FIG. 1 includes generally three major sections, namely: the coolant inlet reservoir or manifold section 10; the center coil section 11 which includes an outer cylindrical flanged housing member 13 around the coil structure 14, such coil structure 14 having electrical terminals in the form of a pair of spaced bus bars 16 and 17 capable of conducting electrical currents in the order of 10,000 to 100,000 amperes; and an upper coolant outlet reservoir or manifold section 18.

The lower section 10 includes generally a flanged cup-shaped member 20 having a pair of coolant conduits 22 and 23 extending out of its base portion 24 whereby coolant may be introduced through a pair of apertured portions, one of which is illustrated at 26 in the base portion 24. The bus bar 17 effectively forms the top of the reservoir section 10, besides serving, as mentioned previously, as one terminal of the electromagnet coil. It is observed that the bus bar 17 has a circular apertured portion 17A through which the coolant may flow in an upward direction, as indicated by the arrows 25. It is also observed that the bus bar 17 is sandwiched between adjacent flanged portions 20A and 13A of the housing members 20 and 13, respectively, so as to provide a watertight joint, and for this latter purpose, gasket means may be provided in such joint for not only assuring a fluid-tight joint, but also to electrically insulate the coil terminal or bus bar 17 from the housing, particularly when the housing elements are of electrically conducting material.

The upper bus bar 16 is sandwiched in like fashion between the upper flanged portion 13B of housing member 13 and the adjacent flanged portion 28A of the upper manifold member 28 to thereby provide a second watertight joint. This member 28 is formed with an apertured base portion 28B which is substantially coplanar with the web portion 28A and which is joined thereto by an annular section 28C of generally inverted U-shaped cross-section, as shown in FIG. 1, this section 28C being formed with a plurality of circumferentially spaced support fins 28D and being in communication with coolant outlet tubes or conduits 30 extending radially outwardly therefrom.

Figure 2:
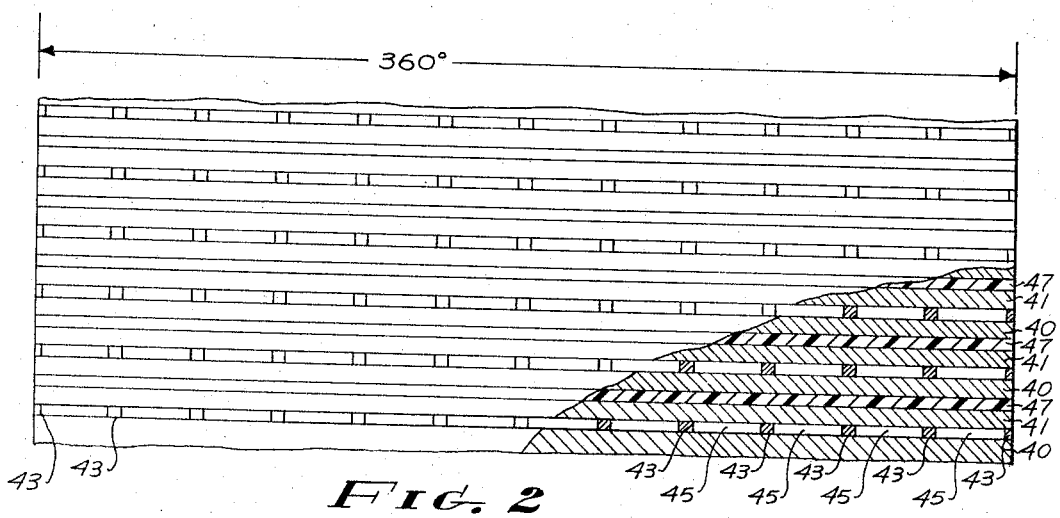
FIG. 2 shows, in enlarged form, some of the structure disclosed also in FIG. 1, this particular view being somewhat schematic in that it is intended to portray a projection, in one plane, of complete turns of the coil shown in FIG. 1, as indicated by the 360° dimension line therein.
Figure 3:
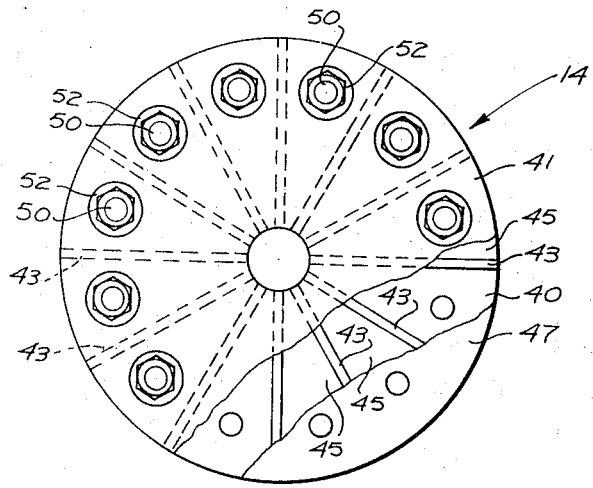
FIG. 3 is generally a top plan view of the coil in the assembly shown in FIG. 1 and illustrates the orientation of bolts and spacers.

The coil structure 14 is formed in a special manner now described in connection with FIGS. 2 and 3. In general, a coil is formed having its turns arranged in a spiral along the axis of the electromagnet, such spiral being actually two copper spirals in parallel with an intervening space therebetween through which the coolant can flow in a general radially and outwardly direction. Thus, as shown in FIG. 2, the coil is formed using two interleaved spiral conductors 40 and 41 with radially extending and spaced spacers 43 defining radial coolant passageways 45. Rings 47 of insulating material, i.e., of structural plastic capable of withstanding large compressive forces, and of substantially the same thickness as the thickness of spacers 43 serve to insulate adjacent turns of the coil. The spacers 43 may be and preferably are of good electrical conducting material since their purpose is to separate those portions of the spirals 40 and 41 which are of the same electrical potential.

In other words, the spacers 43 and those portions of the interleaved spiral windings 40 and 41 contacted by the same comprise the coil windings, the turns of which are insulated by the ring-shaped spacers 47.

Suitable electrical connections are made at the ends of the coil thus formed to its terminals, i.e., the bus bars 16 and 17, and in some cases this may be accomplished simply by clamping the bus bars 16 and 17 against the ends of the coil, and in some cases such bus bars may be bonded to the coil ends as, for example, by welding, brazing, silver soldering, or the like.

The assembly may be releasably secured together using the following described construction. In FIG. 3, a series of circumferentially spaced clamping bolts 50 extend longitudinally through oversized aligned holes in the spiral convolutions and between spacers 43 and are electrically insulated also from the coil ends using for that purpose insulating washers 52 of ceramic material.

The housing is releasably secured together using the construction shown in FIG. 1 wherein a bolt 60 suitably secured at its lower end to the manifold member 20 extends upwardly through the assembly and has its upper end threaded to receive a flanged nut 62 engageable with the top side of the manifold base 28B, the lower side of the base 28B engaging a spacer ring 64 which may be of insulating material and of substantially the same thickness as the thickness of the bus bar 16. To assure rigid clamping of all of the elements when the nut 62 is tightened and to assure a good watertight joint between flange 28A and the bus bar 16, a resilient gasket member may be interposed between the two latter elements; likewise, resilient gasket means may be suitably interposed for the same purposes, as indicated previously, at the lower manifold joint.

It will be observed that a coolant may be pumped through the assembly, with the coolant taking the following general path, namely: from the inlet tubes 22 and 23, through openings 26 (only one of which is shown) into the manifold member 20, through the apertured portion 17A and then radially outwardly through the twelve radial channels 45 (FIG. 2) into the annular space 70 between the coil structure 14 and the housing member 13, through the circumferentially spaced apertured portions 16A in the bus bar 16, into the manifold member 28 and then outwardly through the outlet tubes 30.

Thus, the present invention involves a solenoid construction in which its coil includes two interleaved spaced spirals 40, 41 of generally flat conducting material and with the planes of the flat material of such spirals extending generally parallel. Insulating material 47 in the form of an apertured disc is disposed between a first series of alternate spacings between adjacent convolutions of such spirals, with spacer means 43 between a second series of alternate spacings between adjacent convolutions of such spirals. Those convolutions of spirals 40, 41 spaced by the spacer means 43 comprise the turns of the coil. Such spacer means 43 extends generally radially in the coil and defines with each of such turns radial fluid flow passages extending radially through the coil. Fluid within such radial fluid flow passages is thus in a region wherein there is substantially zero electrical potential gradient. Thus, the cooling fluid flowing through such passages may have a high electrical conductivity without substantially an electrical energy being produced therein. This feature thus allows one to use an additive to the cooling medium such as, for example, a corrosion inhibitor which, when added, results in the cooling medium having substantial electrical conductivity. Thus, the solenoid may be operated with a corrosion inhibitor in the cooling medium for long life and yet with high electrical efficiency.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a solenoid construction, a coil; said coil including two interleaved spaced spirals of generally flat conducting material with the planes of the flat material of said spirals extending generally parallel; insulating material between a first series of alternate spacings between adjacent convolutions of said spirals; spacer means between a second series of alternate spacings between adjacent convolutions of said spirals; the last mentioned convolutions spaced by spacer means comprising the turns of said coil; said spacer means extending generally radially of said coil and defining with each of said turns a radial fluid flow passage extending radially of the coil, said spacer means comprising a series of radially extending metallic bars contacting said adjacent convolutions which define a turn of said coil.

2. In a solenoid construction, a coil; said coil including two interleaved spaced spirals of generally flat conducting material with the planes of the flat material of said spirals extending generally parallel; insulating material between a first series of alternate spacings between adjacent convolutions of said spirals; spacer means between a second series of alternate spacings between adjacent convolutions of said spirals; the last mentioned convolutions spaced by spacer means comprising the turns of said coil; said spacer means extending generally radially of said coil and defining with each of said turns a radial fluid flow passage extending radially of the coil, a cylindrical housing having flanged end portions surrounding and spaced from said coil and defining an annular fluid flow passage therewith in communication with said radial fluid flow passage; a first generally cup-shaped manifold having a flanged portion; a second generally cup-shaped manifold having a flanged portion; a first bus bar sandwiched between one of said housing flanges and said flanged portion of said first manifold and connected to one end of said coil to provide a first terminal therefor; a second bus bar sandwiched between the other of said housing flanges and said flanges portion of said second manifold and connected to the other end of said coil to provide a second terminal therefor; said first bus bar being centrally apertured to provide a flow opening communicating said first manifold with the central portion of said coil; said second bus bar being apertured to intercommunicate said annular flow passage with said second manifold; and conduit means extending from each of said first and second manifolds.

3. A construction as set forth in claim 2, in which fastening means extends longitudinally through said coil and interconnects said manifolds.

4. A construction as set forth in claim 3, in which said fastening means is threaded at one of its ends and mates with a nut element for releasably clamping said terminals between said cylindrical housing and a corresponding one of said manifolds.

5. In a solenoid construction, a coil; said coil including two interleaved spaced spirals of generally flat conducting material with the planes of the flat material of said spirals extending generally parallel; insulating material between a first series of alternate spacings between adjacent convolutions of said spirals; spacer means between a second series of alternate spacings between adjacent convolutions of said spirals; the last mentioned convolutions spaced by spacer means comprising the turns of said coil; said spacer means extending generally radially of said coil and defining with each of said turns a radial fluid flow passage extending radially of the coil, said spacer means comprising a series of radially extending bars contacting said adjacent convolutions which define a turn of said coil.

References Cited by the Examiner
UNITED STATES PATENTS

| | | | |
|---|---|---|---|
| 964,167 | 11/1910 | Mayer | 336—185 |
| 1,912,903 | 6/1933 | Long | 336—60 |
| 3,086,184 | 4/1963 | Nichols | 336—60 |

BERNARD A. GILHEANY, *Primary Examiner.*

G. HARRIS, *Assistant Examiner.*